July 9, 1957  H. KANTER  2,798,226
NECKTIE FORM
Filed Nov. 8, 1956  3 Sheets-Sheet 1
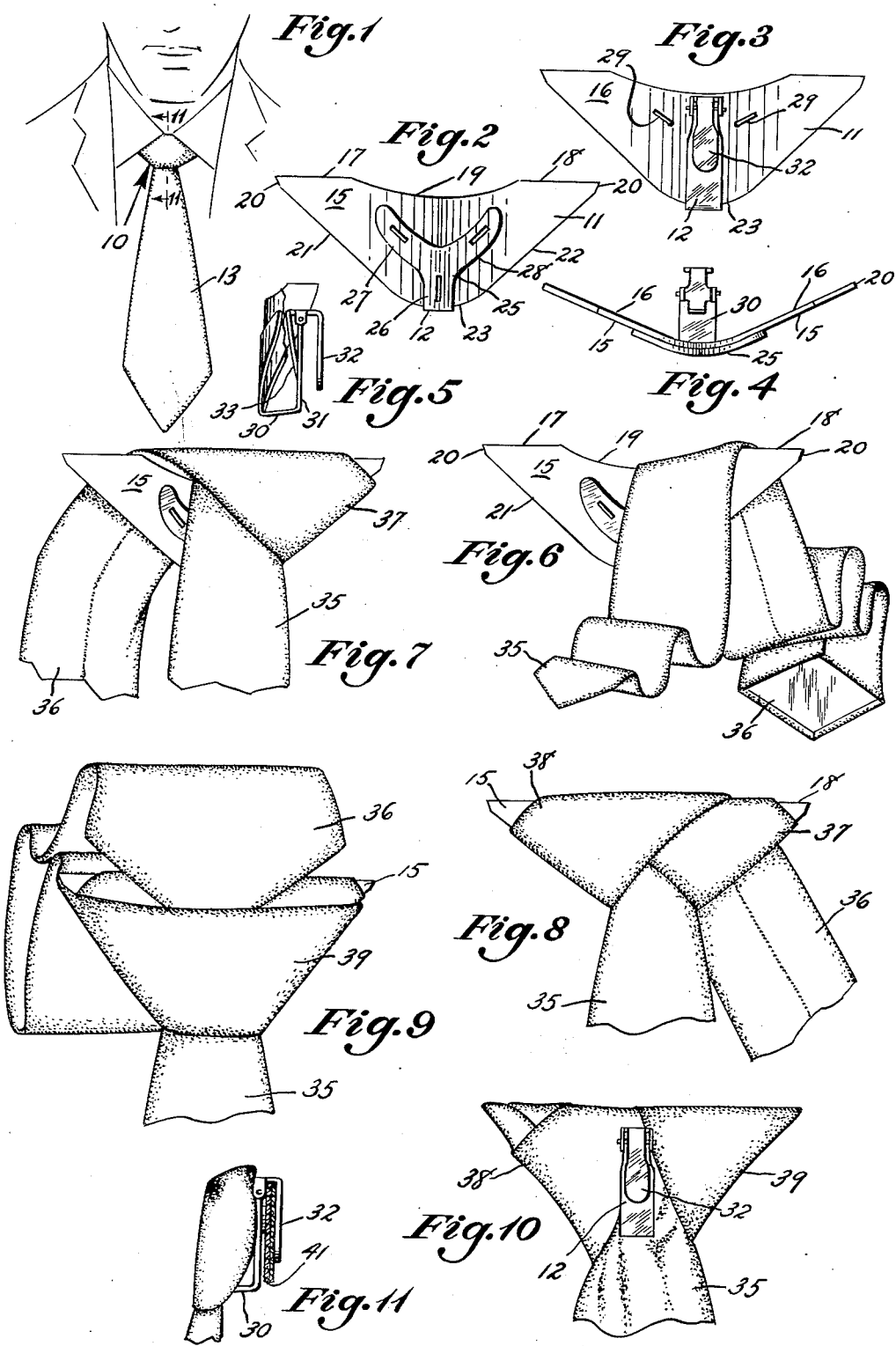

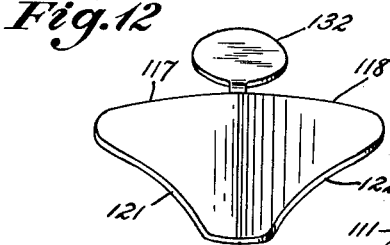

United States Patent Office 2,798,226
Patented July 9, 1957

2,798,226

NECKTIE FORM

Harry Kanter, New York, N. Y., assignor to France Neckwear Co., Inc., New York, N. Y., a corporation of New York Application November 8, 1956, Serial No. 621,047

3 Claims. (Cl. 2—153)

This invention relates generally to the field of permanently tied neckties and more particularly to an improved necktie forming device facilitating the original tying of the necktie, and the engagement of the same with the collar portion of a shirt of a wearer. Such devices are not unknown in the prior art, and the invention lies in the specific constructional details which permit improved facility in use as well as manufacture.

In recent years there has been an increase in the use of the so-called "Windsor knot" as contrasted with the well known "four-in-hand" knot, particularly in conjunction with so-called wide spread collar form. When wearing this type of collar form it is particularly difficult to conceal necktie forms of conventional type, and in most cases the means where concealed cannot successfully engage the wide spread collar wings. Difficulty has also been encountered in positioning the knot at an angle with respect to the neck of the wearer to give the illusion of a hand tied knot, owing to the fact that the characteristics of the "Windsor knot" tend to position the same at a projected orientation with respect thereto.

It is therefore among the principal objects of the present invention to provide improved necktie frame construction of the class described in which the above mentioned disadvantages have been substantially eliminated.

Another object of the invention lies in the provision of an improved necktie frame suited for use in conjunction with wide spread collars in which the means for attaching the same to the neckband is completely concealed from view when in normal wearing position.

A further object of the invention lies in the provision of an improved necktie form which is adapted to adjustably position the knot at an angle with respect to the principal axis of the neckband with which it is associated.

Still another object of the invention lies in the provision of improved necktie form construction in which the cost of fabrication may be of a reasonably low order, with consequent wide sale, distribution and use.

A feature of the invention lies in the fact that special short length ties may be used in conjunction with the necktie form, thereby realizing a substantial saving in material employed in the manufacture of the same.

These objects and features, as well as other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

Figure 1 is a fragmentary view in perspective showing a necktie and necktie form embodying the present invention in position on the neckband of the shirt of a wearer.

Figure 2 is a view in elevation showing the necktie form in detached condition.

Figure 3 is a similar view in elevation showing the rear portion of the necktie form.

Figure 4 is a plan view of the necktie form.

Figure 5 is a side elevational view of the necktie form.

Figure 6 is a view in perspective showing a first step in the tying of a necktie element upon the necktie form shown in Figures 2–5, inclusive.

Figure 7 is a view in perspective of the necktie element and form showing a second step in the tying operation.

Figure 8 is a similar view showing a third step of the tying operation.

Figure 9 is a similar view showing a fourth step of the tying operation.

Figure 10 is a rear view in elevation showing a completely tied tie element.

Figure 11 is a fragmentary side elevational view as seen from the lefthand portion of Figure 10.

Figure 12 is a front elevational view of a second embodiment of the invention.

Figure 13 is a rear elevational view of the second embodiment.

Figure 14 is a vertical central sectional view of the second embodiment showing the clamping means in engaged condition.

Figure 15 is a side elevational view of the second embodiment as seen from the lefthand portion of Figure 13.

Figure 16 is a vertical central sectional view as seen from the plane 16—16 on Figure 13.

Figure 17 is a fragmentary view in perspective showing the second embodiment in installed condition upon the neckband of a shirt of a wearer.

Figure 18 is a view in perspective showing a first stage in the tying of a necktie element comprising the second embodiment.

Figure 19 is a view in perspective showing a second stage thereof.

Figure 20 is a view in perspective showing a third stage thereof.

Figure 21 is a view in perspective showing a fourth stage thereof.

Figure 22 is a view in perspective showing a fifth stage thereof.

Figure 23 is a vertical central sectional view as seen from the plane 23—23 on Figure 24.

Figure 24 is a front perspective showing a third embodiment of the invention.

Figure 25 is a fragmentary enlarged view of the upper righthand portion of Figure 23.

Figure 26 is a horizontal fragmentary sectional view as seen from the plane 26—26 on Figure 24.

Figure 27 is a vertical central sectional view corresponding to that seen on Figure 23 but showing a fourth embodiment of the invention.

Figure 28 is a vertical central sectional view as seen from the plane 28—28 on Figure 29.

Figure 29 is a fragmentary rear elevational view of a fifth embodiment of the invention.

Figure 30 is a fragmentary view in perspective showing the formation of a completed knot using the embodiment of the invention shown on Figures 23, 24 and 27.

Figure 31:
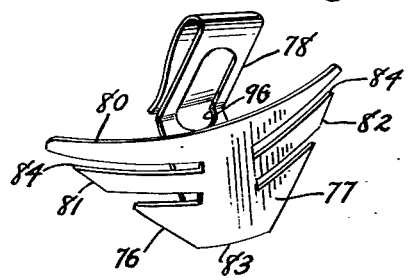
Figure 31 is a view in perspective showing a sixth embodiment of the invention.
Figure 32:
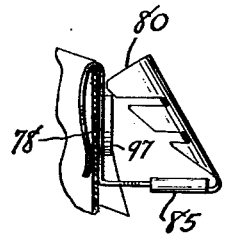
Figure 32 is a side elevational view thereof showing the same in engaged condition upon the neckband of a shirt.
Figure 33:
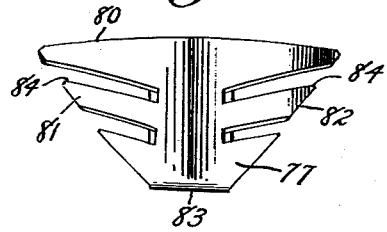
Figure 33 is a front elevational view thereof.
Figure 34:
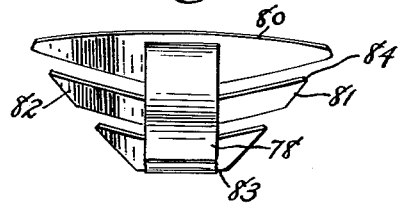
Figure 34 is a rear elevational view thereof.
Figure 35:
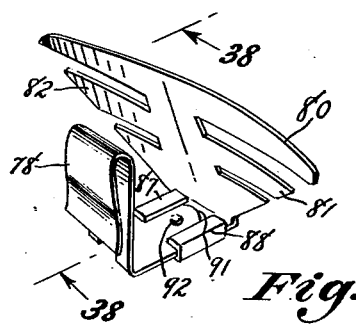
Figure 35 is a rear perspective view thereof showing the component elements in interconnected condition.
Figure 36:
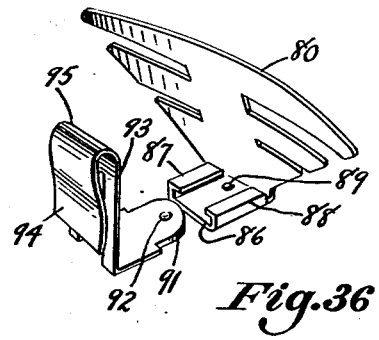
Figure 36 is a similar view in perspective showing the component elements thereof in detached or separated condition.
Figure 37:
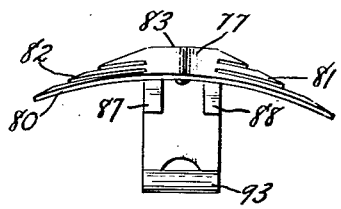
Figure 37 is a plan view of the sixth embodiment.

Turning now to the first embodiment of the invention as illustrated on Figures 1 to 11, inclusive, the device, generally indicated by reference character 10 comprises broadly a necktie supporting element 11, a collar attaching element 12 and a necktie element 13.

The necktie supporting element 11 is preferably formed from lightweight cellulosic material in planar form. It includes an outer surface 15, an inner surface 16, upper rectilinear edges 17 and 18, an upper curved edge 19, pointed end portions 20 and angularly disposed lower edges 21 and 22 as well as a lower rounded edge 23.

The collar attachment element is preferably made of suitable stampings of brass or other ductile material and includes an attaching plate 25 providing means for interconnecting with the necktie support element 11. The attaching plate includes a vertically disposed portion 26 and a pair of angularly disposed portions 27 and 28, the portions 26—28, inclusive, being provided with attaching tongues 29 which extend through the body of the necktie support element. A substantially horizontally disposed spacing portion 30 interconnects the attaching plate 25 with a vertically disposed bracket portion. A clamping portion 32 is pivotally associated with the bracket portion 31, the latter including a spring tensioning member 33 adapted to bear thereupon to maintain the same in engaged position as shown on Figures 4 and 5.

The necktie element 13 may be of conventional construction, but is preferably appreciably shorter by approximately 15 inches, as the same does not encircle the neck of the wearer when tied. As may be seen on Figure 6 et seq., the same includes a relatively smaller wing 35, and a relatively larger wing 36. The same is engaged upon the device 10 by first forming a loop 37 encircling one-half of the necktie supporting element 11 (see Figure 7). The larger wing 36 is then looped about the other half of the supporting element 11 as indicated on Figure 8, following which a third loop 39 is formed as shown on Figure 9 the axis of which lies substantially horizontally. The wing 36 is then inserted through the bight of the loop 39 to give the appearance shown on Figure 1. As will be observed on Figures 10 and 11, the tie element 13 substantially covers the end portions 20 which extend outwardly a distance sufficient to be positioned beneath the collar wings of the shirt when the member 32 is inserted to lie upon the neckband 41 at such time as the device is worn.

Turning now to the second embodiment of the invention as illustrated on Figures 12 to 21 of the drawings, parts corresponding to those of the first embodiment have been designated by similar reference characters with the additional prefix "1."

The second embodiment differs from the first embodiment principally in the provision of an enlarged clamping portion 132 of generally circular shape and the provision of a large connecting bracket 44 and angularly disposed supporting member 45. This construction permits the necktie support element 111 to be disposed at a more horizontal angle when the device is worn, whereby the necktie element 113 may assume the condition shown on Figure 17.

On Figures 18 to 22, inclusive, there is shown a second method by which the necktie element 113 may be operatively mounted upon the necktie supporting element 111 the same including the forming of right angle folds 47 and 48 (see Figure 18), and the forming of additional right angle folds 49 and 50 (see Figures 19 and 20). The folds 49 and 50 are then mutually widened at the upper portions thereof as shown on Figure 20 following which the necktie supporting element 111 is slid into engagement as indicated on Figure 21. Referring to Figure 22, the folded portions 49 and 50 are then moved downwardly to completely enclose the element 111, and the necktie element 113 is then maintained in this condition by stitch means 51. The second embodiment is worn in a manner similar to that shown on Figure 1 relating to the first embodiment.

Turning now to the third embodiment of the invention, as illustrated on Figures 23 to 26, inclusive, parts corresponding to those of the first embodiment have been designated by similar reference characters with the additional prefix "2."

The third embodiment of the invention differs from the preceding embodiments in that the device is formed from molded or cast metal or synthetic resinous materials. The necktie supporting element 211 is interconnected with the collar attachment element 212 by pivotal means formed by a pair of trunnion portions 54 on the necktie supporting element 211 and a tongue 55 on the collar attachment element 212. Pin means 56 interconnects the tongue and trunnion portions, and relatively fixed incremental adjustments are obtained by detent means 57 and 58 on the trunnion portions and tongue 54 and 55, respectively. The clip members 59 and 60 rely upon natural resiliency to grip a collar band therebetween. An indented portion 61 facilitates the formation of the well known "dimple" effect normally created in the tying of a four-in-hand or a Windsor knot. As may be seen on Figure 30, this effect is created by merely placing a finger upon that portion of the cloth which superposes the portion 61 and pressing lightly inwardly as the knot is tightened. When wearing the third embodiment, the desired angle at which the knot extends from the collar may be adjusted while the device is in engaged condition by merely moving the necktie supporting element 211 through a circular path about an axis through the pin 56 to permit the detent means 57 and 58 to coact.

Turning now to the fourth embodiment of the invention, parts corresponding to those of the first embodiment have been designated by similar reference characters with the additional prefix "3."

The fourth embodiment of the invention differs from the above described embodiments in the formation of the entire device from synthetic resinous material possessing a degree of resiliency. The integrally formed strut 64 includes a clip portion 65 which cooperates with an oppositely disposed clip member 66 adapted to be positioned on the opposite side of the neckband of the collar. In this embodiment, there are no relatively moving parts, permitting the device to be produced at an extremely low cost of manufacture, albeit with some sacrifice in the provision for adjustment of the angle of the necktie support element with respect to the collar attaching element.

Turning now to the fifth embodiment of the invention, as illustrated on Figures 28 and 29 of the drawings, parts corresponding to those of the first embodiment have been designated by similar reference characters with the additional suffix "4".

The fifth embodiment of the invention differs principally from the above described embodiment in the utilization of a combination plastic and metallic construction, and the elimination of a spacing portion therebetween. The first and second neckband or collar engaging members 68 and 69 are mounted for relative pivotal movement, the member 69 being provided with a pair of ears 70 and 71 to distribute the engagement surface over the contacting portion 72. The upper portion 73 of the first collar engaging member 68 is bent outwardly to replace the spacing portion and provides an added advantage in that the same is substantially concealed from view when the device is worn.

Turning now to the sixth embodiment of the invention, the device, generally indicated by reference character 76 comprises a necktie supporting element 77 and a collar attachment element 78. The necktie supporting element 77 is preferably formed from thin ductile material, such as brass or a mechanically strong synthetic resin such as polystyrene.

The necktie supporting element 77 includes an upper curved edge 80, a left hand tapering side edge 81, a righthand tapering side edge 82 as well as a lower fold edge 83. A plurality of slots 84 extend into the body of the element 77 to provide resiliency when the necktie element is tightened thereon as illustrated in the above described embodiments. Extending from the fold edge 83 is a shoe member 85 including a base portion 86, a lefthand channel forming member 87 and a righthand channel member 88. Detent means 89 extends upwardly from the base portion 86.

The collar attachment element 78 is provided with a corresponding shoe engaging member 91 having a corresponding detent 92.

Figure 38:
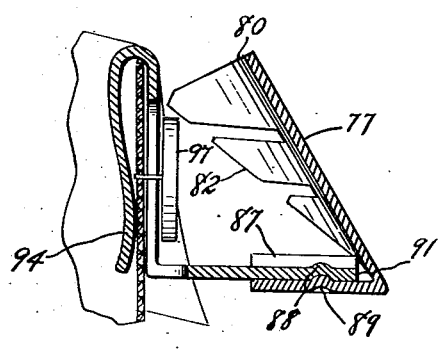
Figure 38 is an enlarged fragmentary vertical central sectional view as seen from the plane 38—38 on Figure 35.

As best seen on Figures 31 and 38, a button engaging member 93 and an inner collar band engaging member 94 are interconnected by a resilient bend portion 95. The opening 96 in the member 93 is of sufficient size to permit a conventional collar button 97 of sewed or stud type to pass therethrough.

As the elements 77 and 78 are separable after the latter has been installed upon a neckband of a collar, it is possible to adjust the angle of the necktie supporting element 77 by bending the shoe member 85 with respect to the main body portion of the element 77. This construction also makes it possible to quickly change ties should the same be desired by a user by merely sliding the shoe engaging member 91 from contact with the shoe member 85.

It may thus be seen that there has been invented novel and highly useful improvements in necktie form construction, which permit the simulation of a well tied Windsor knot having a realistic appearance with the ability to be concealed beneath the tie and conventional wide spread collar wings normally used in conjunction with this type of necktie knot. The devices shown and described may all be manufactured at a relatively low cost, and are durable and compact in appearance. Only ordinary skill is required to install a necktie thereupon, or to engage the same with the neckband of a collar of a shirt, and where care is employed, the artificial look normally found in many of the prior art devices is completely eliminated.

It is to be understood that it is not considered that the invention lies within the specific details of structure shown and set forth in this specification, for obvious modifications will occur to those skilled in the art to which the invention pertains.

What is claimed is:

1. A necktie form for use in conjunction with pretied neckties comprising: a necktie supporting element, a collar attachment element and a spacing member; said necktie supporting element being formed of planar material and having an upper generally horizontally disposed edge, a pair of side edges which converge in a downwardly direction, and a lower edge disposed between the lower terminals of said side edges, said lower edge being generally parallel to said upper edge; the plane of said necktie supporting element being curved in a direction toward said collar attachment element; said spacing member being of planar configuration and having a first end portion joining said necktie supporting element substantially at said lower edge thereof so that the plane of said spacing member and the plane of said necktie supporting element form an acute angle; said collar attachment element including a planar bracket having upper and lower portions, the lower portion of which interconnects with a second end portion of said spacing member forming substantially a right angle therewith; the upper portion of said bracket extending to a height above said spacing member substantially equal to the perpendicular distance from said upper edge of said necktie supporting element to the plane of said spacing member; said bracket having resilient means associated with the upper portion thereof adpated to maintain said bracket in planar contact with the outer surface of the collar band.

2. A necktie form for use in conjunction with pretied neckties comprising: a necktie supporting element, a collar attachment element and a spacing member; said necktie supporting element being formed of planar material and having an upper generally horizontally disposed edge, a pair of side edges which converge in a downwardly direction, and a lower edge disposed between the lower terminals of said side edges, said lower edge being generally parallel to said upper edge; the plane of said necktie supporting element being curved in a direction toward said collar attachment element; said spacing member being of planar configuration and having a first end portion joining said necktie supporting element substantially at said lower edge thereof so that the plane of said spacing member and the plane of said necktie supporting element form an acute angle; said collar attachment element including a planar bracket having upper and lower portions, the lower portion of which interconnects with a second end portion of said spacing member forming substantially a right angle therewith; the upper portion of said bracket extending to a height above said spacing member substantially equal to the perpendicular distance from said upper edge of said necktie supporting element to the plane of said spacing member; said bracket and said spacing member having a continuous opening therein adapted to permit the passage of a collar button therethrough, and resilient means associated with the upper portion of said bracket adapted to maintain said bracket in planar contact with the outer surface of a collar band.

3. A necktie form for use in conjunction with pre-tied neckties comprising: a necktie supporting element, a collar attachment element and a spacing member; said necktie supporting element being formed of planar material and having an upper generally horizontally disposed edge, a pair of side edges which converge in a downwardly direction, and a lower edge disposed between the lower terminals of said side edges, said lower edge being generally parallel to said upper edge; the plane of said necktie supporting element being curved in a direction toward said collar attachment element; said spacing member being of planar configuration and having a first end portion joining said necktie supporting element substantially at said lower edge thereof so that the plane of said spacing member and the plane of said necktie supporting element form an acute angle; said collar attachment element including a planar bracket having upper and lower portions, the lower portion of which interconnects with a second end portion of said spacing member forming substantially a right angle therewith; the upper portion of said bracket extending to a height above said spacing member substantially equal to the perpendicular distance from said upper edge of said necktie supporting element to the plane of said spacing member; said bracket and said spacing member having a continuous opening therein adapted to permit the passage of a collar button therethrough, and resilient means associated with the upper portion of said bracket adapted to maintain said bracket in planar contact with the outer surface of a collar band; said spacing member including two separable portions, a first portion of which is fixedly interconnected with said collar attachment element and a second portion thereof which is fixedly interconnected with said necktie supporting element and means for maintaining said first and second portions of said spacing member in detachable interconnection.

(References on following page)

References Cited in the file of this patent

UNITED STATES PATENTS

| | | |
|---|---|---|
| 1,312,071 | Atanasoff | Aug. 5, 1919 |
| 1,367,461 | Caumont | Feb. 1, 1921 |
| 1,445,611 | Crnoev | Feb. 13, 1923 |
| 1,581,193 | Gilbert | Apr. 20, 1926 |
| 1,636,368 | Johnson | July 19, 1927 |
| 2,133,296 | Holzknecht | Oct. 18, 1938 |

FOREIGN PATENTS

| | | |
|---|---|---|
| 11,817 | Great Britain | May 18, 1912 |
| 292,058 | Switzerland | Oct. 16, 1953 |